US011593018B2

(12) United States Patent
Bhardwaj

(10) Patent No.: US 11,593,018 B2
(45) Date of Patent: Feb. 28, 2023

(54) BLOCK ALLOCATION AND ERASE TECHNIQUES FOR SEQUENTIALLY-WRITTEN MEMORY DEVICES

(71) Applicant: Micron Technology, Inc., Boise, ID (US)

(72) Inventor: Amit Bhardwaj, Hyderabad (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/381,945

(22) Filed: Jul. 21, 2021

(65) Prior Publication Data

US 2023/0028627 A1 Jan. 26, 2023

(51) Int. Cl.
*G06F 3/06* (2006.01)

(52) U.S. Cl.
CPC ............ *G06F 3/0652* (2013.01); *G06F 3/064* (2013.01); *G06F 3/0616* (2013.01); *G06F 3/0644* (2013.01); *G06F 3/0659* (2013.01); *G06F 3/0679* (2013.01)

(58) Field of Classification Search
CPC ...... G06F 3/0652; G06F 3/0616; G06F 3/064; G06F 3/0644; G06F 3/0659; G06F 3/0679
See application file for complete search history.

(56) References Cited

U.S. PATENT DOCUMENTS

2014/0189284 A1* 7/2014 Hyuseinova ............ G06F 12/10 711/206
2021/0389911 A1* 12/2021 Reusswig ............... G06F 3/064
2021/0397562 A1* 12/2021 Bhardwaj ........... G06F 12/0246
2022/0057938 A1* 2/2022 Park ...................... G06F 3/0644
2022/0137858 A1* 5/2022 Lee ......................... G06F 3/064 711/154
2022/0300193 A1* 9/2022 Gao ...................... G06F 3/0689
2022/0300198 A1* 9/2022 Gao ...................... G06F 3/0644

* cited by examiner

*Primary Examiner* — Francisco A Grullon
(74) *Attorney, Agent, or Firm* — Lowenstein Sandler LLP

(57) ABSTRACT

A plurality of zone reset counters and a global reset counter are maintained. A zone reset counter represents a number of times a respective zone of a memory device has been reset. The global reset counter represents a measure of central tendency of the plurality of zone reset counters. A write command directed to a target zone of the memory device is received, and responsive to determining that a target portion of the target zone is not open, a value of the zone reset counter of het target zone is compared to the value of the global reset counter. If the value of the target zone reset counter equals or exceeds the value of the global reset counter, a portion from a free block list is allocated to the target zone. The allocated portion has a highest program erase count among the one or more portions in free block list.

20 Claims, 6 Drawing Sheets

Figure 3:
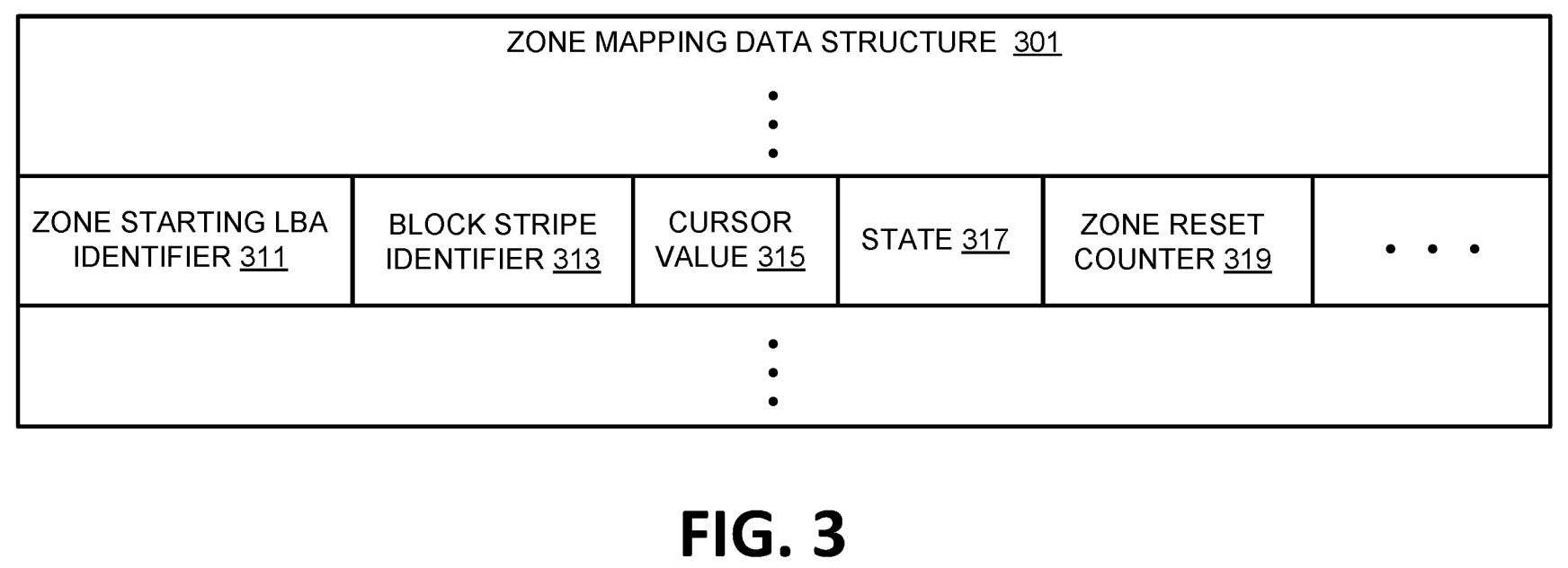

ZONE MAPPING DATA STRUCTURE 301

ZONE STARTING LBA IDENTIFIER 311

BLOCK STRIPE IDENTIFIER 313

CURSOR VALUE 315

STATE 317

ZONE RESET COUNTER 319

BLOCK ALLOCATION AND ERASE TECHNIQUES FOR SEQUENTIALLY-WRITTEN MEMORY DEVICES

TECHNICAL FIELD

Embodiments of the disclosure relate generally to memory sub-systems, and more specifically, relate to block allocation and erase techniques for sequentially-written memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a block diagram illustrating an example of a zone mapping data structure, in accordance with various embodiments of the present disclosure.

DETAILED DESCRIPTION

Figure 1:
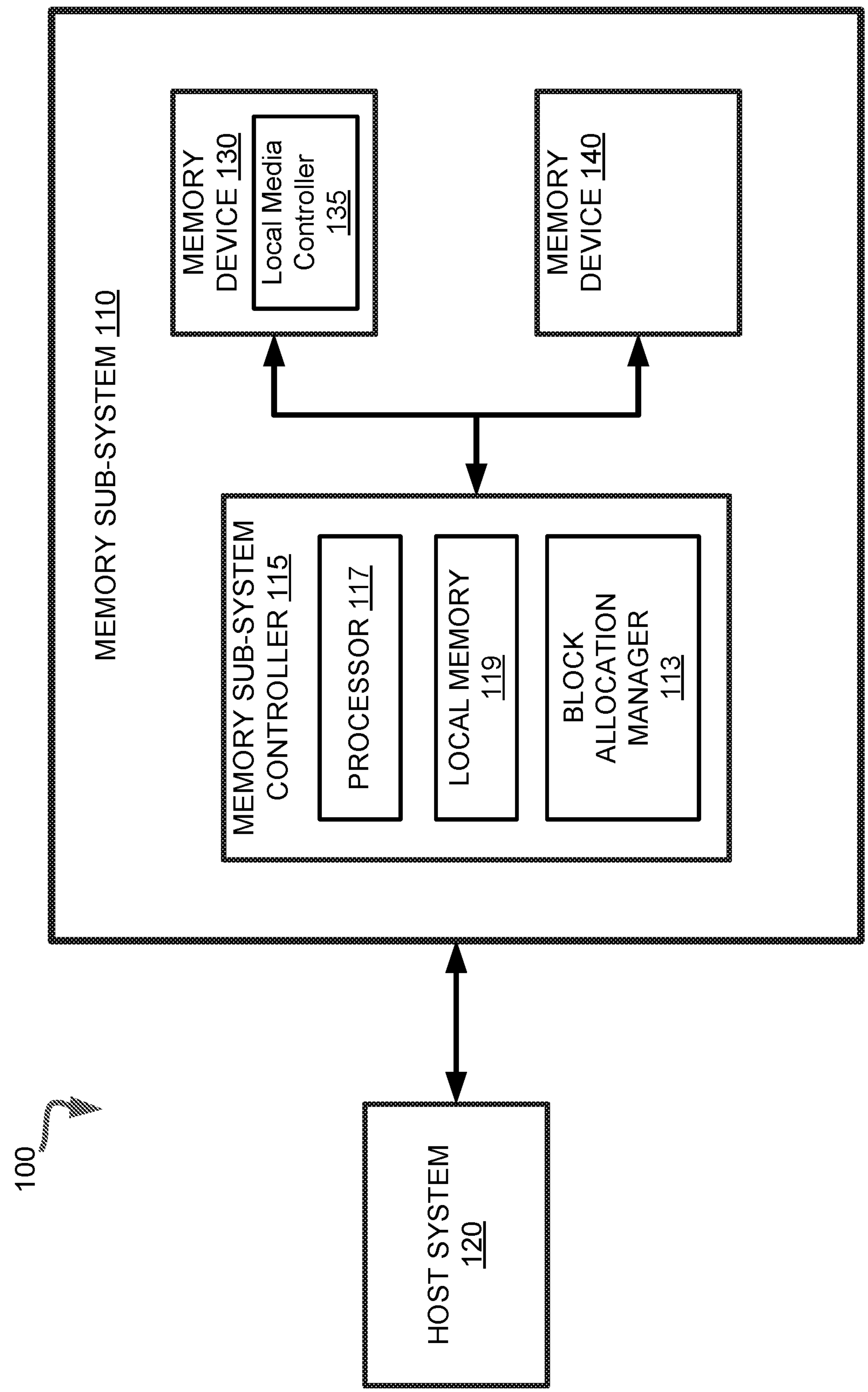
FIG. 1 illustrates an example computing system that includes a memory sub-system, in accordance with some embodiments of the present disclosure.

Aspects of the present disclosure are directed to block allocation and erase techniques for sequentially-written memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory cell can be programmed (written to) by applying a certain voltage to the memory cell, which results in an electric charge being held by the memory cell, thus determining a voltage signal that has to be applied to a control electrode or control gate of the cell to open the cell to the flow of electric current across the cell, between the source electrode and the drain electrode. One phenomenon observed in memory devices is storage charge loss or slow charge loss (SCL), sometimes referred to as temporal voltage shift (TVS), in which the threshold voltage distributions shift towards lower voltage levels as charge diminishes over, e.g., time and/or temperature. SCL affects both memory cells that are programmed to, and memory cells that are empty (e.g., have been recently erased). Hence, cells of blocks that remain in the free block list for an extended period of time can experience voltage shift. Writing to a memory cell that has experienced voltage shift can result in an inaccurate representation of the data being stored. Hence, some memory sub-system controllers perform a calibration scan to evaluate a data state metric (e.g., voltage shift) of the cells within a block prior to writing to the block. If the calibration scan result shows that the memory cells in the block allocated to the free block list have experienced threshold voltage shift, the memory sub-system controller can execute a second erase operation on the block prior to writing to the block. Performing the calibration scan and re-erasing a block can affect the latency and efficiency of the memory sub-system.

A die can also be referred to as a logical unit (LUN). A LUN can contain one or more planes. A memory sub-system can use a striping scheme to treat various sets of data as units when performing data operations (e.g., write, read, erase). A LUN stripe is a collection of planes that are treated as one unit when writing, reading, or erasing data. Each plane in a LUN stripe can carry out the same operation, in parallel, of all the other planes in the LUN stripe. A block stripe is a collection of blocks, one from each plane in a LUN stripe, that are treated as a unit. The blocks in a block stripe have the same block identifier (e.g., block number) in their respective planes. A block stripe can be a set of blocks arrayed across planes of different dies, such that the blocks are grouped together for purposes of data storage. Writing to block stripes allows more data to be concurrently written and read at the same time across multiple dies.

Memory sub-system controllers can receive multiple write requests from a host system, and can be configured to execute the write requests in parallel. One example of a memory sub-system configured to execute multiple write requests in parallel is known as zoned namespaces (ZNS). In a zoned namespace (ZNS), the address space (e.g., logical block address space) of the memory device (or of more than on memory device of the memory sub-system) is divided into zones, which allows for more efficient management of data as the capacity of the memory device increases. For example, each individual zone can be designated for use by a specific client application executed by the host system or some other system with access to the memory device. In a memory device or memory sub-system, one or more zoned namespaces can be implemented, and each zoned namespace can implement one or more zone. A zone can include multiple memory units. A memory unit can refer to a plane, a block, a page, a cell, a zone, a region, or any other segment of memory. Each region can be addressed using a portion of the address space of the memory device or memory sub-system.

Data can be written to a particular zone sequentially and independently from other zones, at varying rates. Some zones within the ZNS can be written to frequently (referred to as a "hot zone"), while other zones within the ZNS can remain unchanged for relatively long periods of time (referred to as a "cold zone"). Zones are written to sequentially within a memory device. A zone can undergo a zone reset in order to reuse the blocks allocated the zone. A zone reset involves erasing all the blocks allocated to the zone, and allocating the blocks to a free block list. Blocks can be allocated to the free block list for an unlimited amount of time.

Writing to a block with a zone is managed by a write cursor. There can be many active write cursors operating concurrently. When the memory sub-system controller allocates a block to a write cursor, some memory sub-system controllers can select, from the free block list, the block that has the lowest program erase counter value. The program erase counter (PEC) of a block represents the number of times the block has been erased, and hence is incremented each time the block is erased. Assigning a block with the lowest PEC to a cold zone can result in the block remaining untouched for a long period of time, which can lead to inefficient wear leveling.

Aspects of the present disclosure address the above-noted and other deficiencies by implementing a memory sub-system controller that allocates a block to a write cursor of a zone based on the zone's frequency of use. The memory sub-system controller can maintain a zone reset counter for each zone that is incremented each time a zone is reset. The memory sub-system controller can also maintain a global reset counter, which can be the average of all the zone reset counters. A zone that has a zone reset counter value that is above the global reset counter (i.e., above average) is a hot zone, while a zone that has a zone reset counter value that is below the global reset counter (i.e., below average) is a cold zone.

The memory sub-system controller can also maintain a program erase counter at the block level. The member sub-system controller can increment the program erase counter of a particular block following each block erase operation. When the memory sub-system controller allocates a block to a particular zone (or write cursor), the memory sub-system controller can first identify whether the zone is hot or cold. If the zone is hot, the memory sub-system controller can allocate a block that has a low program erase counter value (i.e., a cold blocks). If the zone is cold, the memory sub-system can allocate a block that has a high program erase counter value (i.e., a hot block).

When the memory sub-system controller receives a write command, the memory sub-system controller can determine whether the zone to which the write command is directed ("target zone") has sufficient space to store the data specified by the write command. In embodiments, the memory sub-system controller can determine whether the target zone has an open block stripe. A block stripe is a collection of blocks that are treated as a single unit. In embodiments, a block stripe contains a block from each logical unit (e.g., from each die of the memory device). If the target zone has an open block stripe, the memory sub-system controller can execute the write command by writing the data at the open block stripe.

The memory sub-system controller can further determine whether the block stripe has reached a threshold capacity level. This can indicate that the block stripe is nearing full capacity. In response to the block stripe reaching the threshold capacity level, the memory sub-system controller can transfer a block stripe from the media management pool to the free block list. The media management pool is a list of block stripes (or a list of blocks) that are marked for erasure. To avoid threshold voltage shift while blocks are in the media management pool, the memory sub-system controller can maintain two lists: a media management pool and a free block list. The blocks associated with the media management pool can be marked for erasure, but are not actually erased. Once the memory sub-system controller has determined that a block (or block stripe) will be written to in a time period that will avoid threshold voltage shift, the memory sub-system controller can erase the block (or block stripe) and allocate the block (or block stripe) from the media management pool to the free block list. Hence, the memory sub-system controller can select a block stripe from the media management pool, erase the selected block stripe, and transfer the selected block stripe to the free block list. By waiting until a block stripe of the target zone has reached the threshold capacity level before erasing a block stripe from the media management pool, block stripes are allocated to the free pool for a relatively short period of time and are less likely to experience threshold voltage shift. Thus, the memory sub-system controller can reduce or eliminate the need to perform calibration scans and/or re-erase previously erased blocks.

Furthermore, the memory sub-system controller can adjust the threshold capacity in order to further reduce the likelihood that blocks (or block stripes) will remain in the free block list for an extended period of time. In some embodiments, the memory sub-system controller can adjust the threshold capacity level based on whether the free block list is empty or full. If the free block list is empty when the open block stripe of the target zone reaches the threshold capacity level, the memory sub-system controller can reduce the threshold capacity level by a certain value to increase the number of block stripes in the free pool list. In some embodiments, the memory sub-system controller can determine that, even though the free block list is empty, a block stripe is undergoing an erase process, and thus can reduce the threshold capacity level by a certain percentage (e.g., 2%). If the memory sub-system controller determines that the free block list is empty and that no block stripe is undergoing an erase process, the memory sub-system controller can reduce the threshold capacity level by twice the certain percentage (e.g., 4%). At times, the memory sub-system controller can determine that the free block list is full, or that it has performed a threshold number of re-erase operations on the block stripes in the free block list, and can increase the threshold capacity level by a certain percentage (e.g., 2%).

Advantages of the present disclosure include, but are not limited to, efficient wear leveling of a memory device resulting in prolonged endurance of the memory device. By allocating blocks this way (i.e., allocating hot blocks to cold zones, and cold blocks to hot zones), the memory sub-system controller can ensure a more efficient wear leveling of the blocks within the memory device, which can result in prolonged endurance of the memory device. Additionally, by adjusting a threshold capacity level in response to a memory device's current state, aspects of the present disclosure reduce latency and prolong the life of the memory device by avoiding unnecessary calibration scans and performing double erase operations on empty blocks.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a block allocation manager 113 that can allocate and erase blocks efficiently for sequentially-written memory devices. In some embodiments, the memory sub-system controller 115 includes at least a portion of the block allocation manager 113. In some embodiments, the block allocation manager 113 is part of the host system 120, an application, or an operating system. In other embodiments, local media controller 135 includes at least a portion of block allocation manager 113 and is configured to perform the functionality described herein.

The block allocation manager 113 can execute efficient block allocation and erase techniques for sequentially-written memory devices. In embodiments, the block allocation manager 113 can maintain a program erase counter (PEC) for each block in the memory device, and a zone reset counter value for each zone in the memory device. The block allocation manager 113 can increment (e.g., by 1) the PEC associated with a block each time the block is erased, and can increment (e.g., by 1) the zone reset counter associated with a zone each time the zone is reset. A high PEC can indicate that the associated block is a "hot block," while a high zone reset counter can indicate that the associated zone is a "hot zone." Conversely, a low PEC can indicate that the associated block is a "cold block," while a low zone reset counter can indicate that the associated zone is a "cold zone." In embodiments, the block allocation manager 113 can determine a PEC for a block stripe by taking the average of the PECs of the blocks associated with the block stripe, or can maintain a PEC for each block stripe.

The block allocation manager 113 can also maintain a global reset counter. The global reset counter can represent a measure of central tendency (e.g., the mean, mode, or median) of the plurality of zone reset counters. For example, the global reset counter can be the average of the zone reset counters associated with the memory device. The block allocation manager 113 can increment the global reset counter after each zone reset, or in response to a triggering event (e.g., every set number of minutes, or after every set number of zone resets). When the memory sub-system controller receives (e.g., from host system 120) a write command directed to a target zone, the block allocation manager 113 can determine whether the target zone has sufficient space to store the data contained in the write command. That is, the write command can include a payload (i.e., the data that is to be stored on the memory device), and a logical block address (LBA) at which to store the payload. The block allocation manager 113 can determine the target zone based on the LBA, for example, using a zone mapping data structure. In some embodiments, the write command can include a target zone at which to store the payload, and the block allocation manager 113 can translate the target zone number to an LBA, for example using a zone mapping data structure.

In embodiments, the block allocation manager 113 can determine whether the target zone has an open block stripe. If the target zone has an open block stripe, the block allocation manager 113 can execute the write command by writing the data (e.g., the payload) at the open block stripe. The block allocation manager 113 controller can further determine whether the block stripe has reached a threshold capacity level. This can indicate that the block stripe is nearing full capacity, and that the memory sub-system controller may soon assign another block stripe from the free block list to the target zone. As such, in response to the block stripe reaching the threshold capacity level, the block allocation manager 113 can perform a block stripe erase cycle.

During the block stripe erase cycle, the block allocation manager 113 transfers a block stripe from the media management pool to the free block list. The media management pool is a list of block stripes that are marked for erasure. That is, upon receiving a zone reset command directed to a particular zone, the block allocation manager 113 can allocate the block stripe(s) associated with the particular zone to the media management pool and can increase the zone reset counter associated with the particular zone. During the block stripe erase cycle, the block allocation manager 113 can select a block stripe from the media management pool, erase the selected block stripe, and transfer the selected block stripe to the free block list. A block stripe is allocated to the media management pool in response to a zone reset. The blocks associated with the media management pool can be marked for erasure, but are not actually erased. Once the block allocation manager 113 has determined that a block stripe will be written to in a time period that will avoid voltage shift (i.e., by determining that the open block stripe has reached the threshold capacity), the block allocation manager 113 can erase the blocks associated with the block stripe and allocate the block stripe from the media management pool to the free block list.

In selecting a block stripe from the media management pool, the block allocation manager 113 can select the block stripe that has the lowest low program erase counter value. In embodiments, the block allocation manager 113 can select the block stripe within the media management pool that has a PEC value that most closely matches the zone reset counter value of the target zone (i.e., the zone containing the block stripe at which at the write command was performed). In embodiments, the block allocation manager 113 can select a hot block stripe if the target zone is cold, and a cold block stripe if the target zone is hot. The block allocation manager 113 can then erase the blocks associated with the selected block stripe, and allocate the block stripe to the free block list.

If target zone does not have an open block stripe, the block allocation manager 113 can allocate a block stripe from the free block list to the target zone. The free block list can be sorted in descending order of program erase count (PEC) values. Hence, the block stripe with the highest PEC value (the "hot" block stripe) can be at the top of the list, while the block stripe with the lowest PEC value (the "cold" block stripe) can be at the bottom of the list. When allocating a block stripe from the free block list to the target zone, the block allocation manager 113 can compare the value of the zone reset counter to the global reset counter to determine whether the target zone is hot or cold. If the target zone's reset counter value is above the global reset counter value, the memory sub-system controller can determine that the target zone is hot. If the target zone's reset counter value is below the global reset counter value, the memory sub-system controller can determine that the target zone is cold. To support efficient wear leveling, the memory sub-system controller can allocate a hot block stripe to a cold zone, and a cold block stripe to a hot zone. That is, if the target zone has a reset counter value that is greater than or equal to the global reset counter value, the block allocation manager 113 can allocate the block stripe from the free block list that has the lowest PEC value (i.e., from the bottom of the free block list). Conversely, if the target zone has a reset counter value that is less than the global reset counter value, the block allocation manager 113 can allocate a block stripe from the free block list that has the highest PEC value (i.e., from the top of the free block list).

If the free block list is empty, the block allocation manager 113 can wait until a block stripe is allocated to the free block list, and allocate the block stripe to the target zone at that time. An empty free block list can indicate that the threshold capacity used to determine when to transfer a block stripe from the media management pool to the free block list is to be adjusted. The block allocation manager 113 can determine whether a block stripe is currently undergoing a block stripe erase cycle. If the block allocation manager 113 determines that a block stripe is currently being erased (i.e., that a block stripe is undergoing a block stripe erase cycle), the block allocation manager 113 can reduce the threshold capacity by a first percentage (or value). If the block allocation manager 113 determines that a block stripe is not currently being erase, the block allocation manager 113 can reduce the threshold capacity by second percentage (e.g., twice the first percentage). In embodiments, the block allocation manager 113 can determine that the free block list is full and as a result, can determine to increase threshold capacity by a third percentage. The third percentage can the same as the first percentage, the second percentage, or can be a different value.

Further details with regards to the operations of the block allocation manager 113 are described below.

Figure 2:
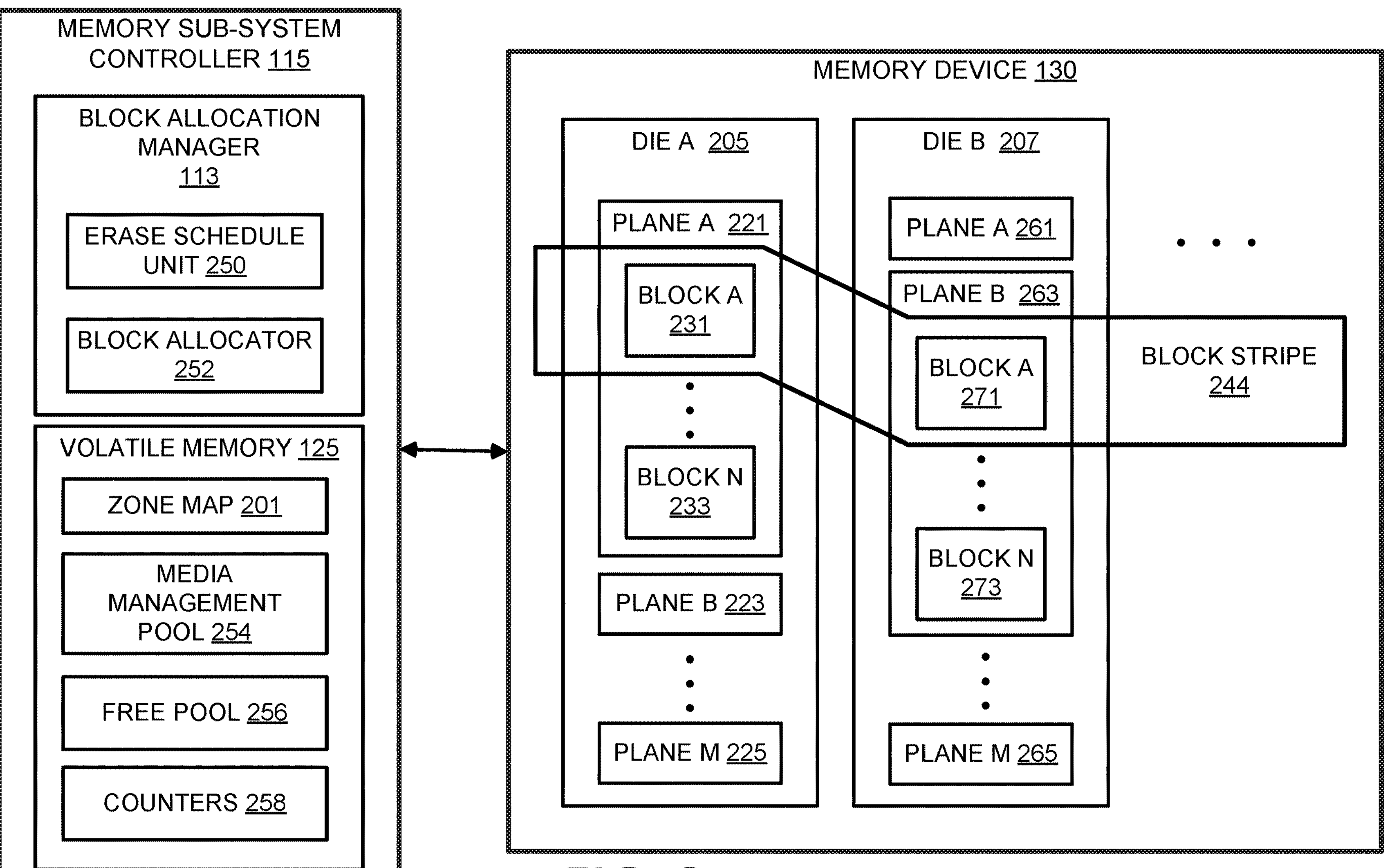
FIG. 2 illustrates the memory sub-system of FIG. 1 in additional detail, in accordance with some embodiments of the present disclosure.

FIG. 2 illustrates the memory sub-system 110 of FIG. 1 in additional detail, in accordance with some embodiments of the present disclosure. The memory sub-system controller can include a block allocation manager 113, which can perform the same function as block allocation manager 113 in FIG. 1. In some embodiments, block allocation manager 113 can include an erase schedule unit 250 and a block allocator 252. In some embodiments, the memory sub-system controller 115 can include local volatile memory 125, e.g., one or a combination of a tightly coupled memory (TCM) or a volatile memory device such as an SRAM device. In some embodiments, local volatile memory 125 can be a separate memory device, such as memory device 140 of FIG. 1. Volatile memory 125 can store a zone map data structure 201, a media management pool 254, a free pool 256, and counters 258. In some embodiments, the zone map data structure 201, the media management pool 245, the free pool 256, and/or the counters 258 can be stored in non-volatile memory. In one embodiment, the zone map data structure 201 includes multiple entries, such that each entry has a block stripe entry identifier that links to an entry within a block stripe map data structure (not illustrated). The zone map data structure 201 is explained in more detail with respect to FIG. 3.

The memory sub-system controller 115 can be communicably coupled to memory device 130. The physical address space of the multiple dies (e.g., Die A 205 and Die B 207) can be hierarchically organized by plane, block, and page. So, for example, each of Die A 205 and Die B 207 can include Plane A 221, 261 through Plane M 225, 265, and each of Plane A 221, 261 through Plane M 225, 265 can include Block A 221, 271 through Block N 233, 273. A block stripe can be defined as a group of blocks arrayed across planes of multiple dies of the memory device(s). As illustrated, block stripe 244 is arrayed to include Block A 231 of Plane A 221 of Die A 205, Block A 271 of Plane B 263 of Die B 207, and so forth, e.g., also of Plane C of Die C and on to further dies, if present and online. One or more block stripe can be associated with a zone of memory device 130.

The memory sub-system controller 115 can receive a write command from the host system 120. The write command can include a payload and an indication of where to store the payload. The indication can be a target zone, and/or a logical block address (LBA) at which to store the payload. The payload can include the data to be stored.

The memory sub-system controller 115 can receive a zone reset command from the host system 120. In response to receive a zone reset command, the memory sub-system controller 115 can mark the one or more block stripes associated with the zone reset for erasure, and can allocate the one or more block stripes associated with the zone reset to the media management pool 254. The memory sub-system controller 115 can also increment the zone reset counter value associated with the zone reset by a certain value, e.g., by 1.

Block allocation manager 113 can include an erase schedule unit 250 and a block allocator 252. The erase schedule unit 250 can efficiently erase blocks or block stripes within memory device 130, and the block allocator 252 can efficiently allocate blocks or block stripes within memory device 130 to zones.

The volatile memory 125 can include a zone map 201, a media management pool 254, a free pool 256, and counters 258. The zone map 201 can be a zone mapping data structure, as is further described with respect to FIG. 3. The media management pool 254 can store a list of block stripes (or in some embodiments, a list of blocks) that are marked for erasure. The free pool 256 can store a list of block stripes (or in some embodiments, a list of blocks) that have been erased and can be allocated to a zone. Counters 258 can store the program erase count (PEC) values for the blocks and/or for the block stripes, the zone reset counter values, the global reset counter value, and a media management counter associated with the memory device 130. In embodiments, the zone reset counter value of each zone is stored in the zone mapping data structure 201.

In one embodiment, memory sub-system controller 115 can receive a write command from host system 120 directed to a target zone. The block allocation manager 113 can determine that block stripe 244 is associated with the target zone (e.g., based on the zone map 201), and that block stripe 244 is open (i.e., the block stripe 244 is not full, or that it has not reach a certain capacity). As such, block allocation manager 113 can execute the write command by storing the payload included in the write command to a block within block stripe 244. Furthermore, in embodiments, block allocation manager 113 can determine that block stripe 244 has reached the threshold capacity. Responsive to determining that block stripe 244 has reached the threshold capacity, the block allocation manager 113 can call the erase schedule unit 250.

The erase schedule unit 250 can select a block stripe from the media management pool 254, erase the blocks associated with the selected block stripe, and allocate the selected block stripe to free pool 256. Responsive to allocating the selected block stripe to free pool 256, the erase schedule unit 250 can deallocate (or remove) the selected block stripe from media management pool 254. The erase schedule unit 250 can select a block stripe from the media management pool 254 based on the program erase count (PEC) of the block stripe. In embodiments, the erase schedule unit 250 can select the block stripe from the media management pool that has the PEC that most closely matches the zone reset count value of the target zone. In embodiments, the media management pool 254 can select a "hot" block stripe from the media management pool if the target zone is "cold," and can select a "cold" block stripe from the media management pool if the target zone is "hot." That is, if the target zone associated with the block stripe that has reached threshold capacity has a zone reset counter value that is above or equal to the global reset counter value (i.e., above or equal to average), the erase schedule unit 250 can select a block stripe from the media management pool that has a low program erase count value. If the target zone associated with the block stripe that has reached threshold capacity has a zone reset counter value that is below the global reset counter value, the erase schedule unit 250 can select a block stripe from the media management pool that has a high program erase count value.

If the write command received from host system 120 is directed to a target zone that does not have an open block stripe (not illustrated), block allocator 252 can select a block stripe from the free pool 256 to allocate to the target zone. Prior to writing to the newly selected block stripe from the free pool 256, the block allocator 252 can perform a calibration scan to determine whether any of the blocks in the newly selected block stripe have experienced threshold voltage shift. Performing a calibration scan of the first block stripe can involve determining a value of a voltage distribution metric associated with the newly selected block stripe. If voltage distribution metric exceeds a threshold criterion, the block allocator 252 can perform a media management operation on the newly selected block stripe; specifically, the block allocator 252 can re-erase the blocks that have experienced a threshold voltage shift. In some embodiments, the counter 258 includes a media management counter that keeps track of the number of re-erase operations performed on memory device 130 within a certain time period (e.g., 5 minutes, or 1 hour). The media management counter can signal when the block allocation manager 113 is performing a high number of re-erase operations. Hence, responsive to determining that the media management counter exceeds a media management threshold criterion, the block allocation manager 113 can adjust the capacity threshold that triggers the erase schedule unit 250. That is, if the calibration scans performed by block allocator 252 result in a large number of re-erase operations being performed on the block stripes within free pool 256, the block allocation manager 113 can increase the capacity threshold to reduce the number of block stripes undergoing the block stripe erase cycle performed by erase schedule unit 250.

The block allocator 252 can select the block stripe from the free pool 256 to allocate to the target zone based on the frequency of use of the target zone. Hence, if the target zone is "hot," the block allocator 252 can allocate a "cold" block stripe from free pool 256; if the target zone is "cold," the block allocator 252 can allocate "hot" block stripe from free pool 256. More specifically, if the zone reset counter value associated with the target zone is above or equal to the global reset counter value, the block allocator 252 can allocate a block stripe from free pool 256 that has a low (or the lowest) program erase count value. If the zone reset counter value associated with the target zone is below the global reset counter value, the block allocator 252 can allocate the block stripe from free pool 256 that has a high (or the highest) program erase count value.

FIG. 3 is a block diagram that illustrates an example of a zone mapping data structure 301, according to various embodiments. The memory sub-system controller 115 can store the zone mapping data structure 301 in non-volatile memory device 130 of FIG. 1. Alternatively or additionally, the memory sub-system controller 115 can store the zone mapping data structure 301 in a volatile memory device (e.g., memory device 140 of FIG. 1). Alternatively or additionally, host system 120 can store at least a part of zone mapping data structure 301 in local memory. The memory sub-system controller 115 can configure or implement the media layout (e.g., a layout of where a data group of a zone is to be located within physical address space) using the zone mapping data structure 301, alone or in combination with other data structures not pictured.

In FIG. 3, the zone mapping data structure 301 is configured to provide memory device layout information for a zone in a namespace, e.g., the LBA space for ZNS operations. The zone mapping data structure 301 can be the same as zone map 201 in FIG. 2. The zone mapping data structure 301 can have multiple entries. Each zone mapping entry in the zone mapping data structure 301 identifies information about a zone, such as a starting LBA 311 of the zone, block stripe identifier(s) 313 associated with the zone, a zone cursor value 315, a state 317 of the zone, a zone reset counter 319, and the like. The block stripe identifier(s) 313 can indicate one or more block stripes that are associated with the zone. The zone cursor value 315 can indicate the current LAB address for writing received data. In some embodiments, zone mapping data structure 301 can include a data field that indicates whether the current block stripe (e.g., associated with cursor value 315) is open. The state 317 can have a value indicating that the zone is empty, full, implicitly open, explicitly open, closed, and the like, to track progress of writing that zone. The zone reset counter 319 can be incremented by a set value (e.g., by "1") after each zone reset.

Figure 4:
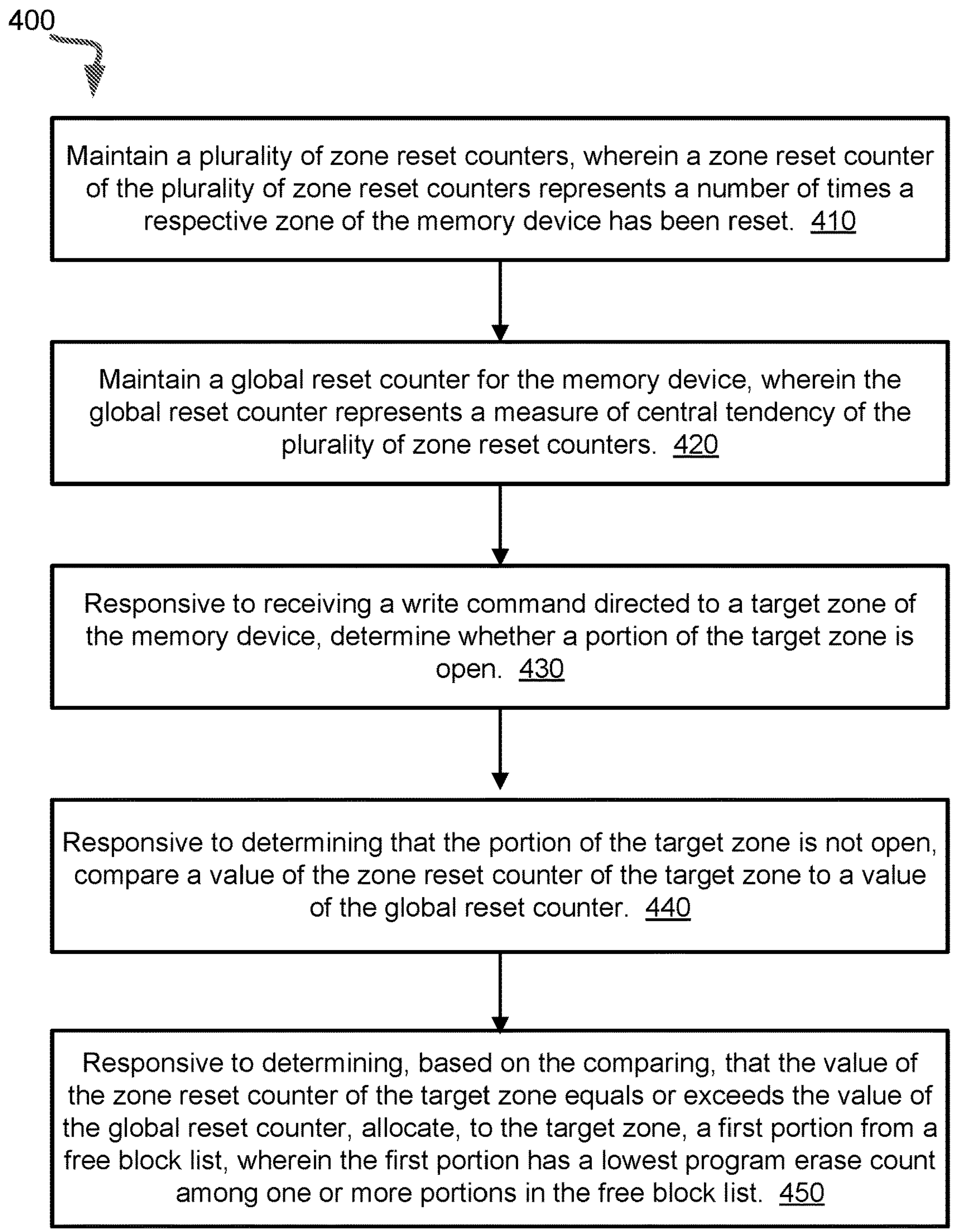
FIG. 4 is a flow diagram of an example method to allocate blocks in a sequentially-written memory device in an efficient manner, in accordance with some embodiments of the present disclosure.

FIG. 4 is a flow diagram of an example method 400 to allocate blocks in a sequentially-written memory device in an efficient manner, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the block allocation manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic maintains a plurality of zone reset counters. A zone reset counter represents the number of times the respective zone of the sequentially-written memory device has been reset. That is, following a zone reset, the processing logic increments the zone reset counter associated with the particular zone, by a certain amount (e.g., by 1).

In embodiments, the processing logic can receive a zone reset command from a host system. Upon receiving a zone reset command directed to a particular zone of the memory device, the processing logic can identify one or more portions associated with the particular zone. A portion can be a block or a block stripe. To execute the zone reset command, the processing logic can add the one or more identified portions (i.e., block stripes or blocks) associated with the particular zone to a media management pool. The media management pool can store a list of regions that are marked for erasure. That is, the portions allocated to the media management pool contain data that is obsolete, and hence the portions in the media management pool can be reused. The processing logic can also increment the zone reset counter associated with the particular zone.

At operation 420, the processing logic maintains a global reset counter for the memory device. The global reset counter represents a measure of central tendency of the plurality of zone reset counters (i.e., the mean, mode, and/or median of the plurality of zone reset counters). In some embodiments, the processing logic determines the global reset counter value by calculating the average of the plurality of zone reset counter values. The processing device can determine the global reset counter value in response to a triggering event, such as every set number of minutes, or every set number of executed zone resets.

At operation 430, responsive to receiving (e.g., from the host system) a write command directed to a target zone of the memory device, the processing logic determines whether a portion of the target zone is open. A portion is open if it is not full, or if it has not reached a certain threshold capacity. In embodiments, the processing logic maintains a zone mapping data structure that includes a portion identifier (e.g., block stripe identifier as illustrated in FIG. 3) and/or a cursor value, identifying the portion at which writes directed to the target zone are to be executed (e.g., the cursor value can identify the logical block address (LBA) at which the payload of the write command is to be stored, and the portion identifier can identify the portion associated with the LBA). The processing logic can determine whether the portion is open by comparing the used capacity of the portion of the target zone with the threshold capacity. The used capacity refers to the amount of space in the portion that is currently being used to store data. If the used capacity of the portion meets or exceeds the threshold capacity, the portion can be considered closed (i.e., not open). If the used capacity of the portion is below the threshold capacity, the portion can be considered open. Additionally or alternatively, the processing logic can maintain (e.g., in the zone mapping data structure) a data field indicator that indicates whether the portion is open or not. For example, the indicator can be a value of "0" if the used capacity of the portion is below the threshold capacity (indicating that the portion is open), and the processing logic can change the value of the indicator to be a value of "1" if the used capacity of the portion reaches or exceeds the threshold capacity.

At operation 440, responsive to determining that the portion of the target zone is not open, the processing device compares a value of the zone reset counter of the target zone to a value of the global reset counter. In embodiments, prior to the comparison, the processing logic can determine the value of the global reset counter by calculating the average of the value of the plurality of zone reset counters.

At operation 450, responsive to determining, based on the comparison, that the value of the zone reset counter of the target zone equals or exceeds the value of the global reset counter, the processing device allocates, to the target zone, a first portion from a free block list, wherein the first portion has the lowest program erase count. The free block list can include a list of portions (e.g., blocks stripes, or blocks) that have undergone a block stripe erase cycle. A block stripe erase cycle is the process in which the process logic selects a portion from the media management pool, erases the blocks associated with the selected portion, and associates the portion with the free block list. The block stripe erase cycle is further described with respect to FIG. 5.

In embodiments, the processing logic can maintain a program erase count (PEC) for each block of the memory device. The PEC associated with a block is incremented by a certain amount (e.g., by "1") after each erase of the block. Additionally, the processing logic can maintain and/or calculate a program erase count for each portion (e.g., for each block stripe). The program erase count for a portion can be the average, mean, and/or median of the program erase counts associated with the one or more blocks associated with the portion. In embodiments, the processing logic can store the portions associated with the free block list in descending order of PEC, in which case the processing logic selects the first portion from the bottom of the free block list as the portion having the lowest PEC. Hence, the processing logic allocates a "cold" portion, i.e., a portion that has a low PEC, to a "hot" zone, i.e., a zone that has a zone reset counter value that equals or exceeds the global reset counter value.

Alternatively, responsive to determining, based on the comparison, that the value of the zone reset counter of the target zone is less than the value of the global reset counter, the processing device allocates, to the target zone, a second portion from a free block list, wherein the second portion has the highest program erase count. That is, the processing logic allocates a "hot" portion, i.e., a portion that has a high PEC, to a "cold" zone, i.e., a zone that has a zone reset counter value that is below the global reset counter value. In embodiments in which the processing logic stores the portions associated with the free block list in descending order of PEC, the processing logic selects the second portion from the top of the free block list as the portion having the highest PEC.

In embodiments, the processing logic can determine that the free block list is empty. That is, the processing logic can determine that there are no portions associated with the free block list. Responsive to determining that the free block list is empty, the processing logic can determine whether a block stripe erase cycle has been triggered. A block stripe erase cycle can be triggered in response to the processing logic determining that the open portion of the target zone reaching a threshold capacity. Responsive to determining that the block stripe erase cycle has been triggered, the processing logic reduces the threshold capacity by the a first value (e.g., by a certain percentage, e.g., 2%). Responsive to determining that the block stripe erase cycle has not been triggered, the processing logic reduces the threshold capacity by a second value (e.g., by twice the first percentage, e.g, 4%). That is, if the free block is empty when the processing logic tries to allocate a portion from the free block list to the target zone, the processing logic reduces the threshold capacity that triggers a block stripe erase cycle. Reducing the threshold capacity that triggers the block stripe erase cycle can result in the free block list receiving a portion more quickly, thus avoiding the situation in which the free block list is empty when a free portion is needed. The amount by which to reduce the threshold capacity can depend on whether a block stripe erase cycle is in progress. Hence, if a block stripe erase cycle is in progress, the processing logic can reduce the threshold capacity by a smaller value (or percentage) than if a block stripe erase cycle is not in progress.

In embodiments, the processing logic can determine that the free block list is full. The processing logic can have a maximum number of portions that can be allocated to the free block list. Responsive to determining that the free block list has reached or exceeded the maximum number of portions, the processing logic increases the threshold capacity by a certain value (or percentage). The threshold capacity is the capacity level that triggers the block stripe erase cycle. The value by which to increase the threshold capacity can be the same or different than the value by which to decrease the threshold capacity (as described above, and below). That is, in some embodiments, the processing logic can increase the threshold capacity by 2%, 4%, or some other value or percentage. Increasing the threshold capacity that triggers the block stripe erase cycle can result in fewer portions being allocated to the free block list, which is desirable when the free block list is full (i.e., exceeds a certain capacity level).

In embodiments, the processing logic can perform a calibration scan on the first portion and/or the second portion from the free block list allocated to the target zone. Performing a calibration scan of the first portion can involve determining a value of a voltage distribution metric associated with the first portion. Responsive to determining that the value of the voltage distribution metric associated with the first portion satisfies a voltage distribution criterion, the processing logic performs a media management operation with respect to the one or more blocks associated with the first portion. For example, the comparison of the voltage distribution metric to the threshold criterion can indicate that the threshold voltage of one or more of the blocks associated with the first portion has shifted. As a result of the voltage shift, the processing logic re-erases the blocks associated with the first portion prior to writing to the portion.

The processing logic can further maintain a media management counter associated with the memory device. The media management counter represents the number of media management operations (e.g., the number of re-erase operations) performed with respect to the one or more portions associated with the free block list over a certain period of time. That is, each time the processing logic perform a re-erase operation in response to determining that the one or more blocks associated with a portion in the free block list has voltage distribution metric exceeding a voltage distribution criterion, the processing logic can increment the media management counter by a certain amount (e.g., by "1"). The media management counter can be reset every certain time period (e.g., 5 minutes, or 1 hour), in order to accurately represent the number of re-erase operations performed within the time period.

In response to determining that the media management counter satisfies a media management criterion (e.g., exceeds a threshold number of re-erase operations within the time period), the processing logic increases the threshold capacity by a value (e.g., by a certain percentage). That is, performing more than a certain number of re-erase operations of the portions associated with the free block list can indicate that the portions associated with the free block list are waiting in the free block list for an extended period of time prior to being allocated to a target zone (an extended period of time is indicated by the threshold distribution exceeding a voltage distribution threshold). In order to avoid performing re-erase operations of portions associated with the free block list, the processing logic can adjust the threshold capacity that triggers a block stripe erase cycle. The processing logic can increase the threshold capacity by a certain percentage (e.g., by 2%), in order to prolong the time that portions are associated with the media management pool, and reduce the time that portions are associated with the free block list before being allocated to a target zone.

Figure 5:
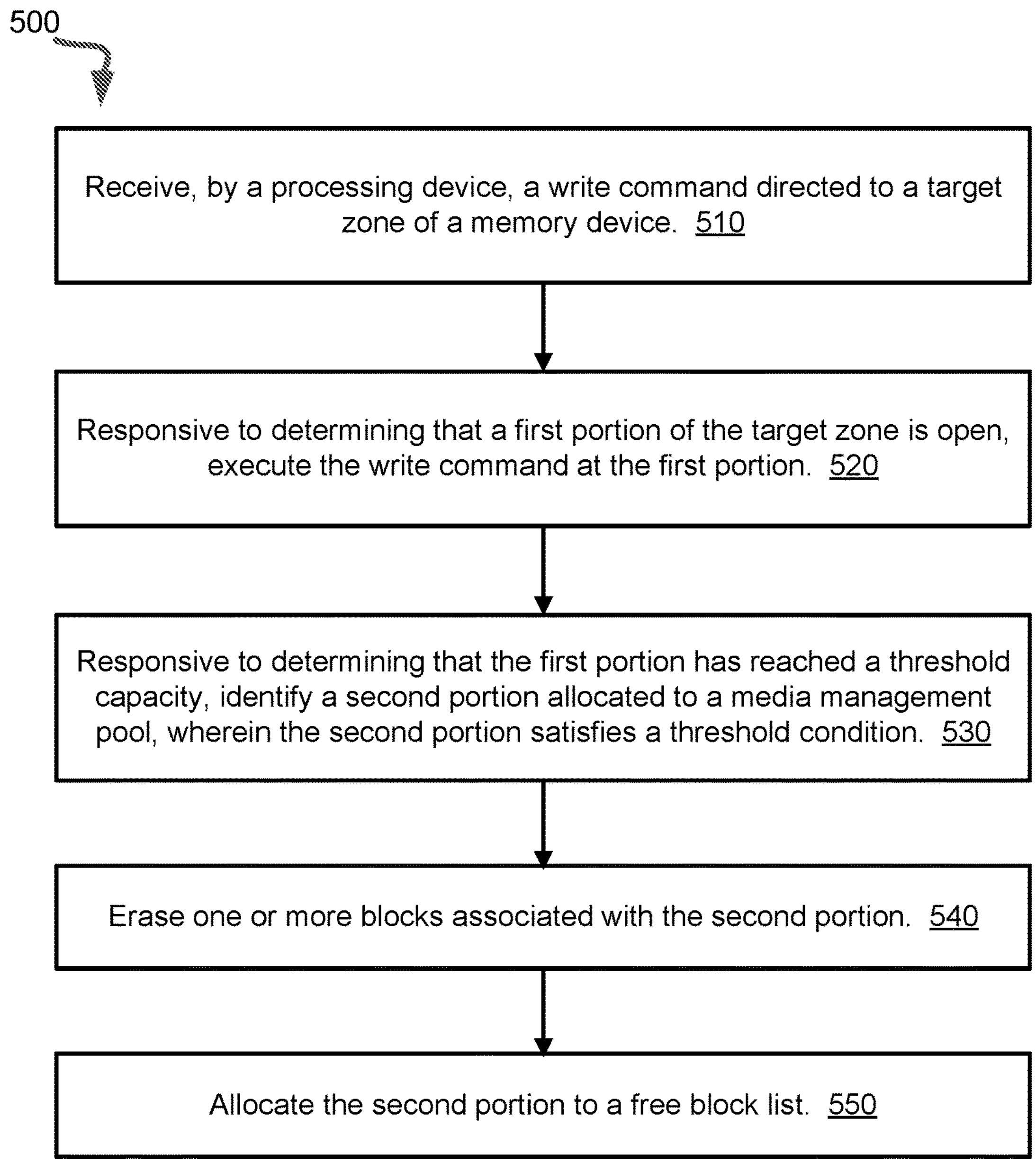
FIG. 5 is a flow diagram of an example method to erase blocks in a sequentially-written memory device in an efficient manner, in accordance with some embodiments of the present disclosure.

FIG. 5 is a flow diagram of an example method 500 to erase blocks in a sequentially-written memory device in an efficient manner, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the block allocation manager 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic receives a write command directed to a target zone of a memory device. In embodiments, the processing logic can receive the write command from a hos system. The write command can include a payload (i.e., the data that is to be written to the memory device), and a logical block address (LBA) at which to store the payload. The processing logic can determine the target zone based on the LBA, for example using a zone mapping data structure. In some embodiments, the write command can include a target zone number at which to store the payload, instead of the specific LBA, and the processing logic can translate the target zone number to an LBA, for example using a zone mapping data structure.

At operation 520, responsive to determining that a first portion of the target zone is open, the processing device executes the write command at the first portion. The processing logic can determine whether a portion of the target is open using, for example, a zone mapping data structure. A portion is open if it is not full, or if it has not reached a certain threshold capacity. Executing the write command can involve storing the payload at the portion of the target zone.

At operation 530, responsive to determining that the first portion has reached a threshold capacity, the processing logic identifies a second portion allocated to a media management pool. The media management pool includes one or more portions that are marked for erasure. The processing logic can identify, as the second portion, the portion from the media management pool that satisfies a threshold condition. In embodiments, the portion that satisfies the threshold condition is based on the PEC of the portion compared to the zone erase count of the target zone. That is, in identifying the second portion that satisfies the threshold criterion, the processing logic identifies a value of a zone reset counter associated with the target zone. The processing logic also identifies a corresponding program erase count (PEC) of the one or more portions in the media management pool. The processing logic can maintain a PEC for each block in the memory device, and the corresponding PEC of a portion can be the average of the PEC values of the blocks associated with the portion. Alternatively, the processing logic can maintain a PEC for the portion. The processing logic can compare the zone reset counter value of the target zone to determine whether the target zone is "hot" or "cold." If the target zone is "hot," the processing logic can identify the second portion as the portion that has the lowest PEC; if the target zone is "cold," the processing can identify the second portion as the portion that has the highest PEC. If the target zone is neither "hot" nor "cold," (i.e., the target zone reset counter value matches the global reset counter value), the processing logic can identify a "cold" portion as the second portion.

In some embodiments, the portion that satisfies the threshold condition is the one for which the PEC value most closely matches the zone reset counter of the target zone. The processing logic compares the PEC of each portion associated with the media management pool to the zone reset counter associated with the target zone. The processing logic identifies the second portion from the one or more portions associated with the media management pool as the portion that has the PEC that most closely matches the zone reset counter value of the target zone. This way, the processing logic is selecting a portion from the media management pool that has similar characteristics as the target zone that is reaching full capacity.

At operation 540, the processing logic erased one or more block associated with the second portion. In embodiments, the processing logic can increment a program erase count associated with the second portion in response to erase the one or more blocks associated with the second portion. That is, the processing logic can maintain a program erase count (PEC) for each portion (e.g., for each block and/or for each block stripe) of the memory device. The processing logic can increment the PEC for each portion in response to performing an erase operation on the portion. At operation 550, the processing logic allocates the second portion to a free block list.

In embodiments, the processing logic can determine that the media management pool is empty, i.e., that there are not portions associated with the media management pool. Responsive to determining that the media management pool is empty, the processing logic reduces the threshold capacity by a value (e.g., by a percentage, such as 3%). The threshold capacity is the capacity that triggers a block stripe erase cycle. Reducing the threshold capacity by a value can result in the block stripe erase cycle being triggered earlier, thus avoiding an empty media management pool.

Figure 6:
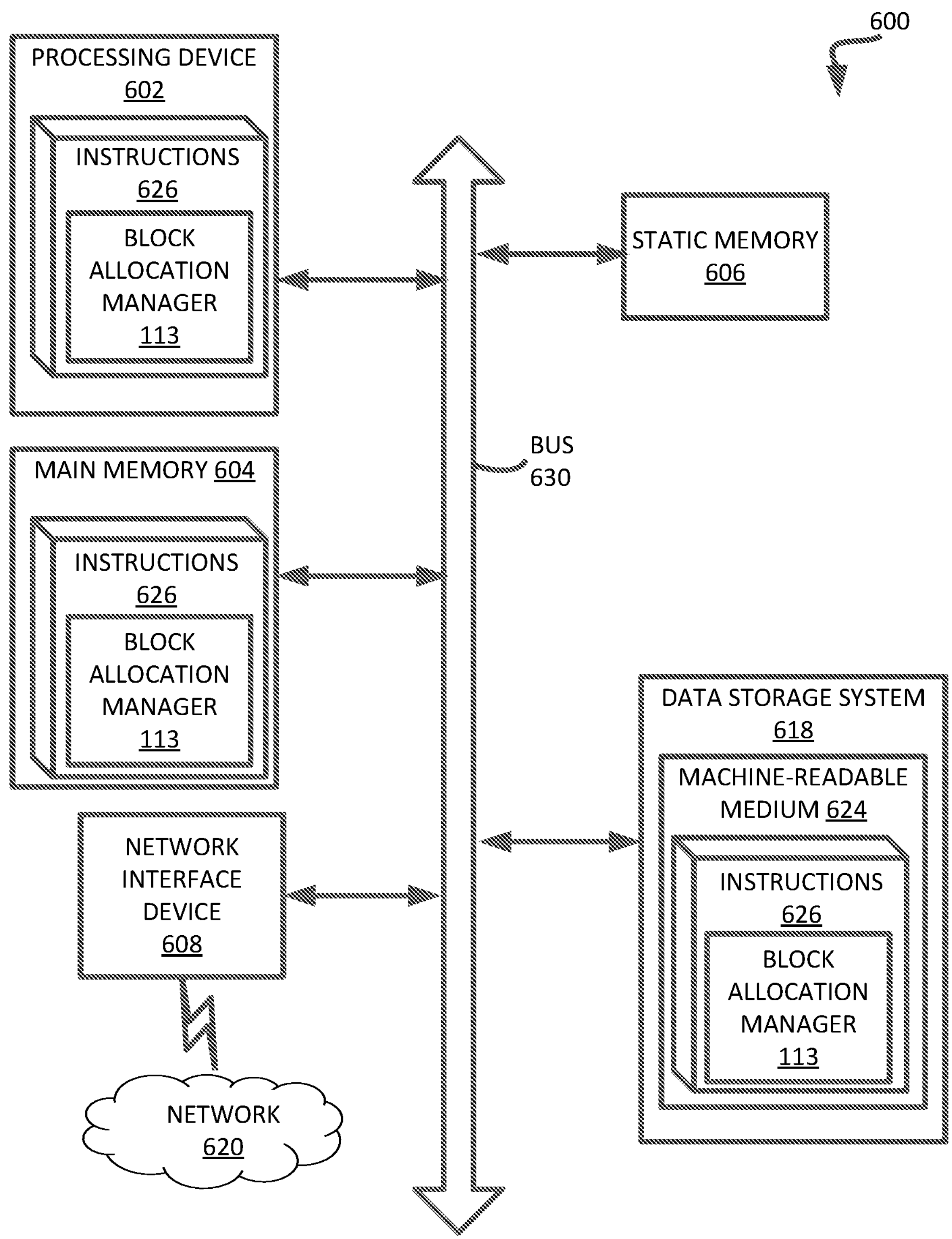
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the block allocation manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a block allocation manager (e.g., the block allocation manager 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

maintaining a plurality of zone reset counters, wherein a zone reset counter of the plurality of zone reset counters represents a number of times a respective zone of the memory device has been reset;

maintaining a global reset counter for the memory device, wherein the global reset counter represents a measure of central tendency of the plurality of zone reset counters;

responsive to receiving a write command directed to a target zone of the memory device, determining whether a target portion of the target zone is open;

responsive to determining that the target portion of the target zone is not open, comparing a value of the zone reset counter of the target zone to a value of the global reset counter; and responsive to determining, based on the comparing, that the value of the zone reset counter of the target zone equals or exceeds the value of the global reset counter, allocating, to the target zone, a first portion from a free block list, wherein the first portion has a lowest program erase count among one or more portions in the free block list.

2. The system of claim 1, further comprising:

responsive to determining, based on the comparing, that the value of the zone reset counter of the target zone is less than the value of the global reset counter, allocating, to the target zone, a second portion from the free block list, wherein the second portion has a highest program erase count among the one or more portions in the free block list.

3. The system of claim 1, further comprising:

responsive to receiving a zone reset command directed to a particular zone of the memory device, identifying one or more portions associated with the particular zone;

adding the one or more identified portions associated with the particular zone to a media management pool; and incrementing the zone reset counter associated with the particular zone.

4. The system of claim 1, further comprising:

responsive to a triggering event, determining the value of the global reset counter by calculating an average of the values of the plurality of zone reset counters.

5. The system of claim 1, further comprising:

responsive to determining that the free block list is empty, determining whether a block stripe erase cycle has been triggered;

responsive to determining that the block stripe erase cycle has been triggered, reducing a threshold capacity by a first value; and responsive to determining that the block stripe erase cycle has not been triggered, reducing the threshold capacity by a second value.

6. The system of claim 1, further comprising:

responsive to determining that the free block list is full, increasing a threshold capacity by a value.

7. The system of claim 1, further comprising:

determining a value of a voltage distribution metric associated with the first portion; and responsive to determining that the value of the voltage distribution metric associated with the first portion satisfies a voltage distribution criterion, performing a media management operation with respect to one or more blocks associated with the first portion.

8. The system of claim 7, further comprising:

maintaining a media management counter associated with the memory device, wherein the media management counter represents a number of media management operations performed with respect to the one or more portions associated with the free block list over a certain period of time; and responsive to determining that the media management counter satisfies a media management criterion, increasing a threshold capacity by a value.

9. A non-transitory computer-readable storage medium comprising instructions that, when executed by a processing device, cause the processing device to perform operations comprising:

maintaining a plurality of zone reset counters, wherein a zone reset counter of the plurality of zone reset counters represents a number of times a respective zone of a memory device has been reset;

maintaining a global reset counter for the memory device, wherein the global reset counter represents a measure of central tendency of the plurality of zone reset counters;

responsive to receiving a write command directed to a target zone of the memory device, determining whether a target portion of the target zone is open;

responsive to determining that the target portion of the target zone is not open, comparing a value of the zone reset counter of the target zone to a value of the global reset counter; and responsive to determining, based on the comparing, that the value of the zone reset counter of the target zone equals or exceeds the value of the global reset counter, allocating, to the target zone, a first portion from a free block list, wherein the first portion has a lowest program erase count among one or more portions in the free block list.

10. The non-transitory computer-readable storage medium of claim 9, wherein the processing device is to perform operations further comprising:

responsive to determining, based on the comparing, that the value of the zone reset counter of the target zone is less than the value of the global reset counter, allocating, to the target zone, a second portion from the free block list, wherein the second portion has a highest program erase count among the one or more portions in the free block list.

11. The non-transitory computer-readable storage medium of claim 9, wherein the processing device is to perform operations further comprising:

responsive to receiving a zone reset command directed to a particular zone of the memory device, identifying one or more portions associated with the particular zone;

adding the one or more identified portions associated with the particular zone to a media management pool; and incrementing the zone reset counter associated with the particular zone.

12. The non-transitory computer-readable storage medium of claim 9, wherein the processing device is to perform operations further comprising:

responsive to a triggering event, determining the value of the global reset counter by calculating an average of the values of the plurality of zone reset counters.

13. The non-transitory computer-readable storage medium of claim 9, wherein the processing device is to perform operations further comprising:

responsive to determining that the free block list is empty, determining whether a block stripe erase cycle has been triggered;

responsive to determining that the block stripe erase cycle has been triggered, reducing a threshold capacity by a first value; and responsive to determining that the block stripe erase cycle has not been triggered, reducing the threshold capacity by a second value.

14. The non-transitory computer-readable storage medium of claim 9, wherein the processing device is to perform operations further comprising:

responsive to determining that the free block list is full, increasing a threshold capacity by a value.

15. The non-transitory computer-readable storage medium of claim 9, wherein the processing device is to perform operations further comprising:

determining a value of a voltage distribution metric associated with the first portion; and responsive to determining that the value of the voltage distribution metric associated with the first portion satisfies a voltage distribution criterion, performing a media management operation with respect to one or more blocks associated with the first portion.

16. The non-transitory computer-readable storage medium of claim 15, wherein the processing device is to perform operations further comprising:

maintaining a media management counter associated with the memory device, wherein the media management counter represents a number of media management operations performed with respect to the one or more portions associated with the free block list over a certain period of time; and responsive to determining that the media management counter satisfies a media management criterion, increasing a threshold capacity by a value.

17. A method comprising:

maintaining a plurality of zone reset counters, wherein a zone reset counter of the plurality of zone reset counters represents a number of times a respective zone of a memory device has been reset;

maintaining a global reset counter for the memory device, wherein the global reset counter represents a measure of central tendency of the plurality of zone reset counters;

responsive to receiving a write command directed to a target zone of the memory device, determining whether a target portion of the target zone is open;

responsive to determining that the target portion of the target zone is not open, comparing a value of the zone reset counter of the target zone to a value of the global reset counter; and responsive to determining, based on the comparing, that the value of the zone reset counter of the target zone equals or exceeds the value of the global reset counter, allocating, to the target zone, a first portion from a free block list, wherein the first portion has a lowest program erase count among one or more portions in the free block list.

18. The method of claim 17, further comprising:

responsive to determining, based on the comparing, that the value of the zone reset counter of the target zone is less than the value of the global reset counter, allocating, to the target zone, a second portion from the free block list, wherein the second portion has a highest program erase count among the one or more portions in the free block list.

19. The method of claim 17, further comprising:

responsive to receiving a zone reset command directed to a particular zone of the memory device, identifying one or more portions associated with the particular zone;

adding the one or more identified portions associated with the particular zone to a media management pool; and incrementing the zone reset counter associated with the particular zone.

20. The method of claim 17, further comprising:

responsive to determining that the free block list is empty, determining whether a block stripe erase cycle has been triggered;

responsive to determining that the block stripe erase cycle has been triggered, reducing a threshold capacity by a first value; and responsive to determining that the block stripe erase cycle has not been triggered, reducing the threshold capacity by a second value.

* * * * *